Patented Jan. 5, 1937

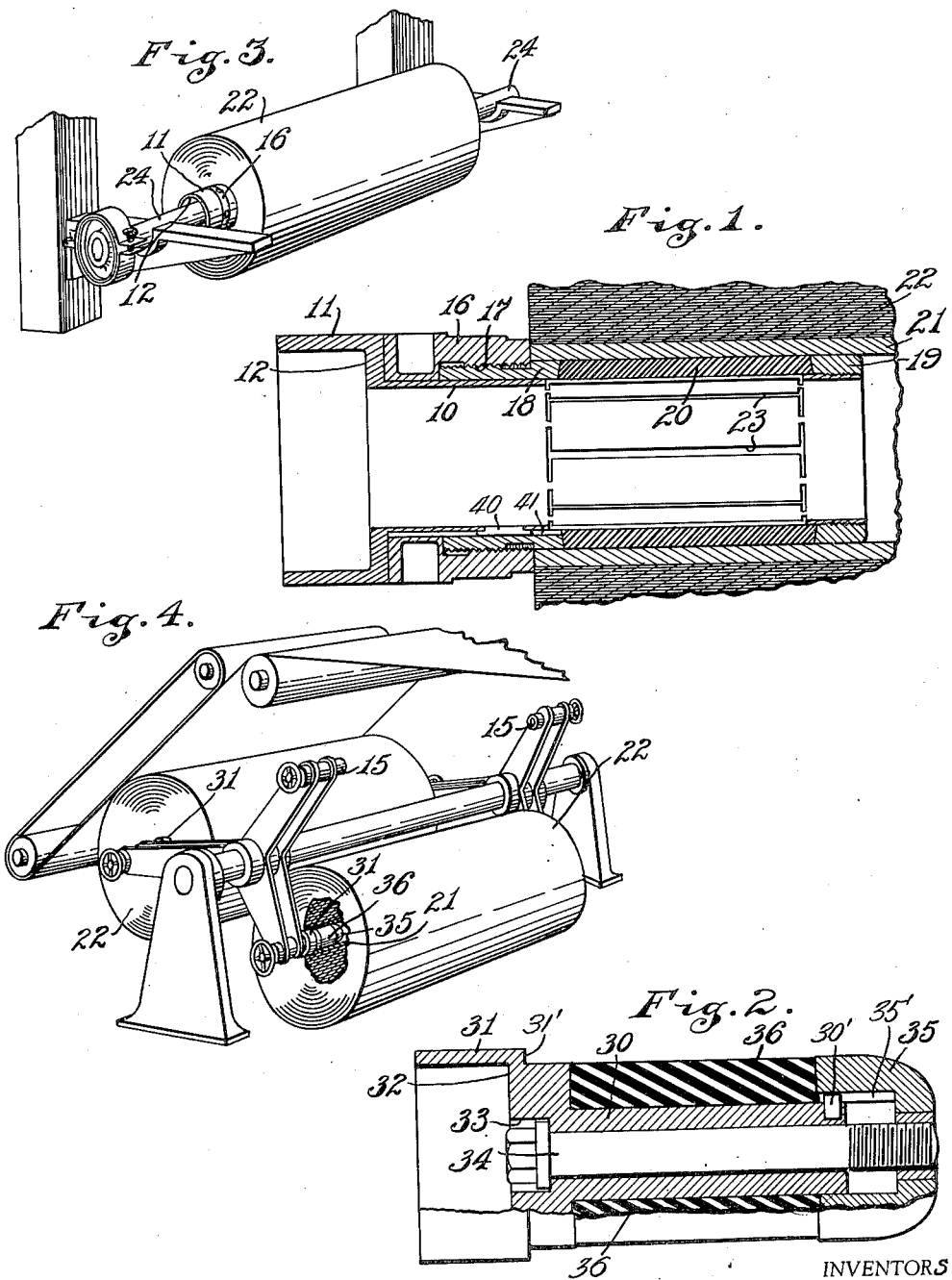

2,066,659

UNITED STATES PATENT OFFICE 2,066,659

ROLL CHUCK FOR WEB PRESSES

Hubert F. Templeton and Richard M. Clouse, Indianapolis, Ind.

Application April 23, 1934, Serial No. 721,940

6 Claims. (Cl. 242—72)

Certain types of printing presses utilize paper in the form of a roll. Some of these presses have a paper-roll-support in the form of a shaft which must be projected through the core of the roll while others have roll-supporting means capable of simultaneously supporting two or more rolls to be brought successively into delivery position and embodying axially separated centering studs upon which the rolls are journaled.

The object of our present invention is to produce an improved form of chuck which may be readily inserted in the end of the tubular core of rolls of paper intended as supply for the above-mentioned web presses, said chuck being of such character as to facilitate the association of a paper roll with the press.

The accompanying drawing illustrates our invention.

Fig. 1 is an axial section of one form of our improved chuck which is capable of use either with the shaft type or the stud type of presses;

Fig. 2 is an axial section of an embodiment of our invention for use in connection with presses of the stud type;

Fig. 3 is a diagrammatic view of a supply roll and its supporting means of the shaft type together with our improved chuck; and Fig. 4 is a diagrammatic view, in partial section, of portions of a press of the stud type together with our improved chuck.

Referring to Fig. 1, 10 indicates a main sleeve having a bore such as to readily receive the roll-supporting shaft of a web press, said sleeve being provided at one end with an external flange or collar 11. The flanged end of the bore of this sleeve, as indicated at 12, is counter-bored to readily receive, by reasonably accurate but readily sliding fit, a standard roll-supporting stud 15 commonly found in presses of the stud type. Journaled upon sleeve 10, to abut flange 11, is a nut 16 having an internally threaded counter bore 17 in which is threaded a pressure ring 18 splined upon sleeve 10. The free end of sleeve 10 is provided with a pressure flange 19, preferably in the form of a collar threaded upon the end of sleeve 10. Between collar 19 and pressure ring 18 is a rubber annulus 20 having an external diameter closely approximating, but slightly less than, the bore of the tubular core 21, of a paper roll 22.

That portion of sleeve 10 which is overlaid by the rubber sleeve 20 is longitudinally slitted, as indicated at 23.

The device shown in Fig. 1 with the pressure ring retracted from the collar flange may have its rubber sleeve portion 20 projected into the end of the tubular core 21 of the paper roll whereupon, by rotation of nut 16 the pressure ring 18 may be crowded lengthwise upon the rubber sleeve to cause said rubber sleeve to expand into the bore of the roll core, thereby centering the chuck in said core. If the roll thus equipped is to be used in conjunction with a press of the stud type, the chucks may then have their counter bores 12 sleeved over the studs 15 of the roll support whereupon the paper roll is ready for presentation to the means for causing rotation of the roll. If the paper roll equipped with our chuck is to be delivered to a press of the shaft type, the shaft 24 will be first projected through the roll and through the bores of our chuck before the rubber sleeve is compressed and in that instance, when the nut 16 is rotated to crowd the pressure ring 18 upon the rubber sleeve, said rubber sleeve will not only expand radially outwardly into the bore of the paper roll but will also expand radially inwardly so as to distort the slit portion of the sleeve 10 inwardly to accurately center the sleeve upon the shaft, thereby rigidly connecting the paper roll with the shaft so that, when said shaft is associated with its bearings in the press, the paper roll will be properly balanced. The sleeve 10 is provided with a key 40 and the pressure ring 18 is provided with a keyway 41 so that the pressure ring 18 is non-rotatively associated with the sleeve.

Referring now to Fig. 2, the sleeve 30 is provided at one end with an external flange 31 and this end of the sleeve is counter-bored at 32, to receive the roll-supporting stud of a stud type press and is also counter-bored at 33 to receive the head of bolt 34, the threaded end of which projects beyond the opposite end of the sleeve. Splined upon this opposite end of sleeve 30 is a pressure ring 35 having a threaded bore adapted to receive the bolt. Sleeved over sleeve 30 between flange 31 and the pressure ring 35 is a rubber sleeve 36, the external diameter of which is a trifle less than the bore of the roll core. This form may be projected into the ends of the core of a paper roll and accurately centered therein by turning bolt 34 to draw the pressure ring 35 toward flange 31 so as to longitudinally compress the rubber sleeve 36 and thus expand it into the bore of the roll core whereupon the counter bores 32 may be readily sleeved over the studs 15 of the press.

Pressure ring 35 is provided with a key-way 35' which slidably fits the key 30' carried by sleeve 30 so that the pressure ring 35 is nonrotatively but slidably associated with sleeve 30.

It will be noted that the external diameter of the right-hand end of part 16, in Fig. 1, and the external diameter of the shoulder 31', in Fig. 2, are slightly greater than the external diameter of sleeve 21, as is clearly shown in Fig. 1; so that a gauge, relative to the paper 22, is furnished the pressman by means of which he may note the near exhaustion of the paper.

We claim as our invention:

1. A centering chuck for printing press supply rolls comprising a sleeve counter-bored at one end to receive the usual centering studs found in such presses, a rubber sleeve sleeved over a portion of said first-mentioned sleeve against an end abutment carried by the first-mentioned sleeve, a pressure ring nonrotatively and slidably associated with said first-mentioned sleeve, and a bolt extending from the bottom of said counter bore and journaled in the first-mentioned sleeve and threaded in said pressure ring.

2. A centering chuck for printing press supply rollers comprising a sleeve counter-bored at one end to receive the usual centering studs found in such presses, and having a portion adapted to contact the end of the core of a paper roll and of a diameter slightly exceeding the external diameter of such core, a rubber sleeve sleeved over a portion of said first-mentioned sleeve against an end abutment carried by the first-mentioned sleeve, a pressure ring nonrotatively associated with said sleeve at the end of the rubber sleeve opposite said abutment, and a bolt extending from the bottom of said counter bore and journaled in the first-mentioned sleeve and threaded in said pressure ring.

3. A centering chuck for printing press supply rolls comprising a main tubular body having a circumferential external flange and having a bore one end of which is adapted to receive a roll-supporting press stud, a pressure ring splined upon said body in opposition to said flange, a longitudinally compressible radially expansible sleeve sleeved over said body between said flange and said pressure ring, and means rotatively associated with said body and the pressure ring by which the pressure ring may be moved toward its companion flange to longitudinally compress and radially expand such sleeve, said body comprising portions inwardly distortable.

4. A centering chuck for printing press supply rolls comprising a main tubular body having a circumferential external flange and having a bore one end of which is adapted to receive a roll-supporting press stud, a pressure ring splined upon said body in opposition to said flange, a longitudinally compressible radially expansible sleeve sleeved over said body between said flange and said pressure ring, and means rotatively associated with said body and the pressure ring by which the pressure ring may be moved toward its companion flange to longitudinally compress and radially expand such sleeve.

5. A centering chuck for printing press supply rolls comprising a main tubular body having a circumferential external flange, a pressure ring splined upon said body in opposition to said flange, a longitudinally compressible radially expansible sleeve sleeved over said body between said flange and said pressure ring, and means rotatively associated with said body and the pressure ring by which the pressure ring may be moved toward its companion flange to longitudinally compress and radially expand such sleeve, said body comprising portions inwardly distortable.

6. A centering chuck for printing press supply rolls comprising a main tubular body having a circumferential external flange, a pressure ring splined upon said body in opposition to said flange, a longitudinally compressible radially expansible sleeve sleeved over said body between said flange and said pressure ring, and means rotatively associated with said body and the pressure ring by which the pressure ring may be moved toward its companion flange to longitudinally compress and radially expand such sleeve.

HUBERT F. TEMPLETON.
RICHARD M. CLOUSE.